United States Patent [19]
Tomko et al.

[11] Patent Number: 6,022,925
[45] Date of Patent: Feb. 8, 2000

[54] PARTIAL INTERPENETRATING NETWORKS OF POLYMERS

[75] Inventors: Revathi R. Tomko, North Olmsted; Louisa D. DiCola, Parma; Lorette Madigan, Cleveland; David J. Tetzlaf, Brecksville, all of Ohio

[73] Assignee: The Sherwin-Williams Company, Cleveland, Ohio

[21] Appl. No.: 09/102,867

[22] Filed: Jun. 23, 1998

[51] Int. Cl.[7] .................................................... C08L 41/00
[52] U.S. Cl. ................................... 524/547; 524/813
[58] Field of Search .................................... 524/547, 813

[56] References Cited

U.S. PATENT DOCUMENTS

| | | | |
|---|---|---|---|
| 3,705,164 | 12/1972 | Honig et al. | 260/29.6 |
| 4,318,833 | 3/1982 | Guagliardo | 524/457 |
| 4,497,932 | 2/1985 | Trovati | 524/591 |
| 4,644,030 | 2/1987 | Loewrigkeit et al. | 524/457 |
| 4,722,965 | 2/1988 | Wong et al. | 524/812 |
| 4,730,021 | 3/1988 | Zom et al. | 524/457 |
| 5,023,294 | 6/1991 | Cozzi et al. | 524/547 |
| 5,173,526 | 12/1992 | Vijayendran et al. | 524/457 |
| 5,202,378 | 4/1993 | Barnett | 524/833 |
| 5,314,942 | 5/1994 | Coogan et al. | 524/457 |
| 5,371,133 | 12/1994 | Stanley | 524/457 |

FOREIGN PATENT DOCUMENTS

| | | | |
|---|---|---|---|
| 0 239 213 A2 | 9/1987 | European Pat. Off. | C09J 3/14 |
| 0 308 115 A2 | 3/1989 | European Pat. Off. | C08F 283/00 |
| 0 309 113 A1 | 3/1989 | European Pat. Off. | C08L 75/04 |
| 0 309 114 A1 | 3/1989 | European Pat. Off. | C08F 283/00 |
| 0 353 797 A1 | 2/1990 | European Pat. Off. | C08G 18/08 |
| 0 658 608 A1 | 6/1995 | European Pat. Off. | C09D 157/00 |
| WO 95/26994 | 10/1995 | WIPO | C08G 18/08 |

OTHER PUBLICATIONS

A. Patsis, H. X. Xiao, K. C. Frisch, and S. Al–Khatib; "Ionomer/Semi–IPN Coating from Polyurethanes and Vinyl Chloride Copolymers" —Journal of Coatings Technology; Dec. 1986; vol. 58, pp. 41–47.

M. Tehranisa, R. A. Ryntz, H. X. Xiao, P. I. Kordomenos, and K. C. Frisch; "Urethane Acrylic Interpenetrating Polymer Networks (IPNs) for Coating Applications" —Journal of Coating Technology; Mar. 1987; vol. 59 —pp. 43–49.

*Primary Examiner*—Terressa Mosley-Boykin
*Attorney, Agent, or Firm*—Heidi A. Boehlefeld; Robert E. McDonald; Vivien Y. Tsang

[57] ABSTRACT

A process for producing a coating compositions for use over chalky substrates comprising a partial interpenetrating network of a polyurethane component and a waterborne polymer component, wherein the polyurethane component is prepared in the presence of the waterborne polymer component.

17 Claims, No Drawings

PARTIAL INTERPENETRATING NETWORKS OF POLYMERS

BACKGROUND OF THE INVENTION

This invention relates to improved resins and polymers for use in and as exterior architectural house paints and coatings, particularly coatings having utility over weathered, chalky substrates such as brick, wood, vinyl and aluminum siding. A chalky substrate is one in which the elements (sun, rain, snow, heat, etc.) have degraded the paint film's integrity to such a degree that it breaks down and a fine powder develops that resides on the surface of the structure or dwelling. This powder consists of pigment, binder, additives, etc. which due to the degradation of the paint film are no longer part of a coherent film. Such a degraded film does not provide good protection for the substrate below. Furthermore, such chalky substrates are generally not preferred surfaces for applying a new layer of paint since the chalk will adversely affect the adhesion characteristics of the new paint to the substrate.

U.S. Pat. No. 4,722,965 discloses a latex polymer comprising a major amount of an alkyl acrylate and/or alkyl methacrylate and a minor amount of a secondary amine, which latex polymer can be blended with vinyl acetate/acrylic copolymer coatings to form a latex coating composition with improved chalk adhesion properties.

European Patent Application 94309136.3 discloses the use of a polymeric blend of a latex, an acid-functional alkali-soluble resin and an aminosilane in order to provide adhesion of coatings over chalky substrates.

U.S. Pat. No. 5,202,378 discloses an exterior latex paint having improved chalk adhesion wherein the latex paint is based on a polymeric film-forming binder containing minor amounts of copolymerized fatty acid acrylate or methacrylate such as lauryl or stearyl methacrylate.

Presently, there are a number of commercially available latex and alkyd paints that claim to be suitable for use on chalky substrates. All presently available coatings have shortcomings, either in adhesion properties or in other paint properties. The present invention offers better adhesion over chalky substrates and other substrates than the presently available coatings.

SUMMARY OF THE INVENTION

The present invention comprises polymers and coatings prepared therefrom that have exceptional adhesion over chalky substrates making them ideal coatings for use in exterior paints. The present invention comprises a polymer network, also referred to herein as a "partial interpenetrating network" or "PIPN" comprising at least two components; a polyurethane component and a waterborne polymer component, wherein the polyurethane component is at least partially prepared in the presence of the waterborne polymer component, and wherein one or both of said components can contain functional groups that allow it to cure or crosslink with itself or with the other component, upon application to the substrate.

The preparation of the polyurethane component in the presence of the waterborne polymer component ensures a partial interpenetrating network of the two polymers that is not only physically different from a cold blend of two separately prepared polymers but is also functionally superior to such a cold blend in its adhesion over chalky substrates and other substrates such as galvanized metal, hard board, wood, concrete, plastic, leather, vinyl and substrates coated with aged, glossy alkyd paint.

While there are a number of different variations and preferred embodiments to the present invention, central to the success of the invention is the preparation of two components, a waterborne polymer component and a polyurethane component. In one embodiment, the polyurethane is prepared as a prepolymer which is neutralized and dispersed into a latex polymer composition and is subsequently chain extended in the presence of the latex composition to create a network of the two polymers that is more highly integrated than a physical blend of the two separate components. Alternative and preferred embodiments of the present invention, to be described more fully below, allow the formulator to incorporate functional groups on either or both of the polyurethane component or the waterborne polymer component which enable the components to cure or crosslink (either individually or with each other) after application to the substrate.

The polymer network, and coatings containing the polymer network, produced by the present invention have particular utility over chalky substrates including previously painted wood, concrete, cement, brick, vinyl and aluminum siding and the like. They can also be applied over metal, concrete, wood, plastic, leather, vinyl and other unchalked substrates.

DETAILED DESCRIPTION OF THE INVENTION

The compositions of this invention are polymer systems comprising a polyurethane component and at least one waterborne polymer component, wherein the polyurethane component is partially prepared in the presence of the waterborne polymer component to produce a final polymer network that is highly integrated and which has performance characteristics better than a mere physical blend of the individual components. The compositions of this invention are polymer networks which, in one sense, can be described as stable dispersions of polyurethane polymers at least partially prepared in the presence of a waterborne polymer media. However, unlike a physical blend of a preformed polyurethane polymer dispersion and a preformed waterborne polymer, partial preparation of the polyurethane polymer in the presence of the waterborne polymer results in a network of the two components that is unlike a physical blend in both its physical properties and its performance properties. Depending on the functionalities present on the polyurethane component, the waterborne polymer component, or both, the two components can crosslink (either individually or together) after application to the substrate. The composition of the present invention may contain two or more waterborne component, such as, for example, a latex and a silicone emulsion. Other waterborne polymer components may include water-reducible alkyds, alkyd emulsions, acrylic polymers, polyester emulsions, fluoropolymer emulsions, polyurethane-acrylic dispersions, silicone emulsions, polyethylene emulsions, polyurethane dispersions, and polyamide dispersions.

Polyurethane Component

As described above, the polyurethane component is generally prepared as a prepolymer that is dispersed in the waterborne polymer component whereafter it is further reacted to produce the final product of this invention. The polyurethane prepolymer is preferably prepared from ingredients that produce a predominantly linear prepolymer, that is, a prepolymer prepared from substantially difunctional reactants.

The polyurethane prepolymer compositions of this invention are generally produced by first reacting an active-hydrogen containing composition with an isocyanate-functional material. The isocyanate-functional material is preferably a diisocyanate-functional material selected from the group of aromatic, cycloaliphatic or aliphatic isocyanates. Examples of suitable isocyanates include 1,6-hexamethylene diisocyanate, 2,4-toluene diisocyanate, 2,6-toluene diisocyanate, 1,4-phenylene diisocyanate, 4,4'-diphenylmethane diisocyanate, 2,4'-diphenylmethane diisocyanate, isophorone diisocyanate, cyclohexane-1,4-diisocyanate, 4,4'-dicyclohexylmethane diisocyanate, p-xylylene diisocyanate, meta-1,1,3,3-tetramethylxylylene diisocyanate and mixtures thereof. Small amounts of tri-functional isocyanates such as a trimer of hexamethylene diisocyanate in the form of isocyanurate or biuret and the trimer of isophorone diisocyanate may be used.

Preferred diisocyanates include 4,4'-dicyclohexylmethane diisocyanate, meta-1,1,3,3-tetramethylxylylene diisocyanate, isophorone diisocyanates and mixtures thereof. Most preferred is a combination of 4,4'-dicyclohexylmethane diisocyanate and meta-1,1,3,3-tetramethylxylylene diisocyanate. When a mixture of two or more isocyanates is used, the ratio of NCO equivalents contributed by the individual isocyanates is not critical.

The active-hydrogen containing composition that is reactive with the isocyanate is preferably difunctional with respect to isocyanate groups, that is, they have two active hydrogen atoms as determined by the Zerewitinoff method. Active hydrogens include hydrogen atoms attached to oxygen, nitrogen or sulfur and thus useful compounds include those having at least two of the groups —OH, —SH, —NH and —NH$_2$. Examples of such compounds include diols, diamines, aminoalcohols and mercaptans. The active-hydrogen containing composition is preferably a diol selected from the group consisting of polyester diols, polyether diols, polyacetal diols, polyamide diols, polyester polyamide diols, poly(alkylene ether) diols, polythioether diols and polycarbonate diols.

Suitable polyether diols are, for example, the condensation products of ethylene oxide, propylene oxide, butylene oxide, or tetrahydrofuran, and their copolymerization, graft or block polymerization products, such as, mixed ethylene oxide, propylene oxide condensates, and the graft polymerization products of the reaction of olefins under high pressure with the mentioned alkylene oxide condensates. Suitable polyethers are prepared by the condensation of the mentioned alkylene oxides with polyhydric alcohols, such as, ethylene glycol, 1,2-propylene glycol and 1,4-butanediol.

Suitable polyester diols, polyester amide diols and polyamide diols are preferably saturated and are obtained, for example, from the reaction of saturated or unsaturated polycarboxylic acids with saturated or unsaturated polyhydric alcohols. Suitable carboxylic acids for preparing these compounds include, for example, adipic acid, succinic acid, phthalic acid, terephthalic acid, and maleic acid. Suitable polyhydric alcohols for preparing the polyester diols include, for example, ethylene glycol, 1,2-propylene glycol, 1,4-butanediol, neopentyl glycol, hexanediol, and trimethylolpropane. A suitable amino alcohol for preparing polyester amide diols is, for example, ethanolamine. Suitable diamines for preparing polyesteramide diols and polyamide diols are, for example, ethylene diamine and hexamethylene diamine.

Suitable polyacetals can be prepared, for example, from 1,4-butanediol or hexanediol and formaldehyde. Suitable polythioether diols can be prepared, for example, by the condensation of thiodiglycol with ethylene oxide, propylene oxide, butylene oxide or tetrahydrofuran.

Additional useful diols include Bisphenol A, polybutadiene based diols, polysiloxane based diols and fluorinated diols.

The most preferred difunctional active-hydrogen containing starting materials are a combination of 1) the polyester diols formed from the reaction of saturated and unsaturated dihydric alcohols such as ethylene glycol, propylene glycol, neopentyl glycol, 1,4-butanediol, 1,4-butenediol, 1,6-hexanediol, furan dimethanol, and cyclohexane dimethanol with saturated and unsaturated polycarboxylic acids such as maleic acid, fumaric acid, itaconic acid, succinic acid, glutaric acid, adipic acid, isophthalic acid, terephthalic acid, phthalic anhydride, dimethyl terephthalate, dimer acids and the like; and 2) a diol containing hydrophilic groups. One such preferred polyester diol is Rucoflex™ 1015–120 (a mixture of polyester diols based on neopentyl glycol, hexanediol and adipic acid, commercially available from Ruco Polymer Corporation). A particularly preferred diol containing hydrophilic groups is dimethylolpropionic acid. When used, these two diols are preferably present in percentages such that the Rucoflex™ material contributes between about 30% to about 70% of the OH functionality of the total materials. As the examples below demonstrate, a preferred embodiment comprises Rucoflex™ 1015–120, trimethylolpropane, dimethylolpropionic acid and cyclohexane dimethanol.

Although it is preferred to use difunctional active hydrogen containing compounds, small amounts of tri- and higher functional compounds may be used. Examples of such higher functional compounds include trimethylol propane, pentaerythritol, polyester triols and polyether triols. Large amounts of such higher functional compounds will create an undesirable crosslinked, non-linear prepolymer in solution.

In one preferred embodiment, the polyurethane component contains at least one functional group that enables the polyurethane component to further crosslink (autooxidatively or otherwise) once the composition has been applied to the substrate and is exposed to ambient air drying conditions normally associated with house paints.

During the preparation of an isocyanate functional polyurethane prepolymer, the preferred ratio of total active-hydrogen containing materials to isocyanate should be such that there is an excess of isocyanate functionality over active-hydrogen functionality. Preferably, the ratio of molar equivalents of NCO to total active-hydrogen should be between about 1.01:1 to about 2.0:1; preferably between about 1.01:1 to about 1.7:1. In order to prepare a hydroxy functional polyurethane prepolymer, there should be an excess of hydroxy functionality over isocyanate functionality.

Optionally, and preferably present during the reaction is up to about 0.06%, preferably between about 0.01% and about 0.04% (by weight based upon total solids of active-hydrogen containing compositions and diisocyanate) of a catalyst such as di-butyl tin dilaurate, tin octoate and the like.

To ensure that the polyurethane prepolymer is dispersible in an aqueous media such as a latex media, pendant ionizable groups are incorporated into the prepolymer and then subsequently ionized. Useful ionizable groups include pendant groups such as carboxylate, sulfonate, sulfate, phosphonate and/or phosphate groups located along the polymer backbone. Preferred are carboxylate groups which are derived by preparing the polyurethane prepolymer from an active hydrogen containing composition having a carboxyl group. For example, diols, diamines and difunctional thiols containing a carboxyl group are useful. The preferred carboxy-functional active hydrogen containing composition is dimethylolpropionic acid. The polyurethane prepolymer must contain a sufficient amount of the carboxyl groups which are ionized by neutralization to render the polyurethane prepolymer dispersible. Preferably, between about 1% and about 10% of the polyurethane prepolymer weight solids is contributed by active-hydrogen containing compositions having ionizable groups.

The ionizable groups of the polyurethane prepolymer are converted by combining the prepolymer with water containing a tertiary amine. Tertiary amines that may be used include triethylamine, trimethylamine, triisopropyl amine, tributyl amine, triethylene diamine, N,N-dimethylcyclohexyl amine, N,N-dimethylstearyl amine, N,N-dimethyl aniline, N-methylmorpholine, N-ethylmorpholine, N-methylpiperazine, N-methylpyrrolidine, N,N-dimethylethanol amine, N,N-diethyl-ethanol amine, triethanol amine, N-methyldiethanol amine, dimethylaminopropanol, 2-methoxyethyldimethyl amine, N-hydroxyethylpiperazine, 5-diethyl-amino-2-pentanone and mixtures thereof, and dispersed. The amount of tertiary amine added should be sufficient to neutralize at least about 90% of the ionic groups present in solution. Preferably, the tertiary amine is added in an amount sufficient to neutralize 100% of the ionic groups. Other weak bases may be used to neutralize the ionic groups, but tertiary amines are preferred because they do not react with the free isocyanate groups of the prepolymer.

Preparation of the polyurethane prepolymer is typically carried out by charging the active-hydrogen containing composition with the catalyst to a reaction vessel, heating the contents to a temperature of between about 85° C. and about 100° C., and adding, via continuous or stepwise addition over a period of time, preferably between about 0.5 hour to about 1.5 hours, the isocyanate-functional materials. Optionally present can be a solvent such as n-methyl-2-pyrrolidone, dimethyl formamide, methyl ethyl ketone, toluene, and mixtures thereof in an amount ranging up to about 20% by weight based upon the total weight of the materials present in the reaction vessel. After complete addition of the isocyanate materials, the reaction vessel temperature is maintained between about 85° and 100° C. for approximately 3 to 4.5 hours. The residual isocyanate percentage can be measured by any means well known in the art. At this point, the polyurethane prepolymer is now formed and is ready for further reaction according to this invention. The prepolymer is dispersed in water containing a tertiary amine such as, for example, triethylamine, which neutralizes the ionic groups of the prepolymer. Once the polyurethane is dispersed in water, the dispersion is ready for incorporation of the waterborne polymer component.

Overall, the weight ratio of polyurethane prepolymer component to waterborne polymer component is generally in the range of about 1:99 to about 99:1, preferably from about 1:4 to about 1:1.

In order to chain extend the polyurethane prepolymer into a PIPN in the presence of the waterborne polymer component, a functional compound capable of chain extending the polyurethane prepolymer such as a polyol, an amino alcohol, a primary or secondary aliphatic, alicyclic, aromatic or heterocyclic amine or diamine, an amine functional silicone or an amine functional silane is used. Water-soluble chain extenders are preferred. Examples of suitable chain extenders include ethylene diamine, propylene diamine, butylene diamine, hexamethylene diamine, cyclohexylene diamine, piperazine, 2-methyl piperazine, isophorone diamine, phenylene diamine, tolylene diamine, xylylene diamine, hydrazine, dimethylhydrazine, adipic dihydrazide, ethylene glycol, di-, tri-, and tetraethylene glycol, propane 1,2-diol, propane 1,3-diol, neopentyl glycol and mixtures thereof, equivalents thereof and the like in an amount sufficient to react with up to at least 90% of the theoretical amount of residual NCO functionality is generally added to the composition for chain extension of the polyurethane. Chain extenders having a functionality greater than two such as, for example, diethylenetriamine, can also be included but should be limited to a small amount to avoid creating a composition that is highly crosslinked. If the polyurethane prepolymer is hydroxy functional, a water dispersible or emulsifiable polyisocyanate can be used as a chain extender. If the polyurethane prepolymer is acetoacetoxy functional, a polyamine, polyaldehyde or water dispersible or emulsifiable polyisocyanate can be used as the chain extender. If the polyurethane prepolymer contains n-methylol functional groups, a water dispersible or emulsifiable polyisocyanate can be used as the chain extender. Creation of a partial-interpenetrating network by chain extension of the polyurethane prepolymer in the presence of a fully-prepared waterborne polymer composition creates a final composition that is not physically the same as a cold, physical blend of a similar polyurethane dispersion and a similar waterborne polymer.

As discussed above, the dispersing media for the polyurethane prepolymer is preferably water to which the waterborne polymer component is subsequently added. It can be a combination of the waterborne polymer component and additional water.

Variations on the polyurethane structure

In one embodiment, the polyurethane component of the present invention contains ingredients that enable it to autooxidatively cure after application to the substrate when exposed to ambient air curing conditions normally associated with architectural paints and coatings. In particular, during or subsequent to the preparation of the polyurethane prepolymer, but prior to the chain extension of the prepolymer in the waterborne polymer component, compositions which attach to the polyurethane backbone can be added to the prepolymer composition. Each of these compositions are reacted directly to the polyurethane backbone but remain unreactive during the chain extension process and also remain unreactive during normal storage of the final product. However, upon application of the product to the substrate and exposure to drying conditions normally associated with house paint, these added functionalities autooxidatively cure the polyurethane component. Preferred compositions that allow such post-application crosslinking include active-hydrogen containing compositions that are monofunctional or difunctional with respect to isocyanates. Some of these active-hydrogen containing materials include the fatty amines, allyl amines, diallyl amines, ethoxylated allyl amines, ethoxylated allyl alcohols, fatty alcohols, allyl alcohols, trimethylol propane mono- and di-allyl ether, hydroxy ethyl acrylate, hydroxy ethyl methacrylate, mono- and di-glycerides obtained by alcoholysis of drying oils with polyols or the reaction of drying fatty acids with polyols, acetoacetate-containing materials such as the adduct of trimethylolpropane with t-butyl acetoacetate, direct introduction of acetoacetate functionality onto the polyurethane prepolymer by reaction with t-butyl acetoacetate or diketene, and reaction of the backbone with anhydride-functional drying oils in either the prepolymer preparation or chain extension stage.

Post-crosslinking functionalities that cure by the condensation mechanism may also be added to the polyurethane polymer backbone, for example, by reacting the polyurethane prepolymer with an amine functional di- or trialkoxysilane, a diamine functional di- or trialkoxysilane, or an isocyanate functional di- or trialkoxysilane. Post-crosslinking functionalities can also be prepared by treating the polyurethane prepolymer with adipic dihydrazide and formaldehyde. Additionally, the polyurethane prepolymer may be modified to include post-crosslinking functionalities by incorporation of epoxy-functional oils, epoxy functional di- or trialkoxysilanes, or amine or diamine functional di- or trialkoxysilanes in the chain extension stage. Aminoplast crosslinkers such as hexamethoxymelamine or those with a high content of N-methylol or imino groups can be added in the chain extension step to introduce crosslinking by condensation.

Waterborne Polymer Component

Suitable for use as the waterborne polymer component of the invention is any waterborne polymer that does not have functional groups which are reactive with the NCO functionality of the polyurethane prepolymer or the polyamine or polyhydroxy chain extender, as well as the carboxyl groups and any functional groups on the prepolymer. Such waterborne polymers include latex emulsions, acrylic polymers, polyester emulsions, water-reducible alkyd polymers, alkyd-acrylic dispersions, alkyd emulsions, fluoropolymer emulsions, silicone emulsions, polyethylene emulsions, polyurethane dispersions, polyamide dispersions and polyurethane-acrylic dispersions.

A preferred waterborne polymer useful in the present invention can be almost any latex composition that is suitable for use as a paint and/or coating, preferably a latex formulated to be an exterior paint and/or coating. Conventional latex polymers are prepared by polymerizing at least one ethylenically unsaturated monomer in water using surfactants and water soluble initiators. Typical ethylenically unsaturated monomers include vinyl monomers, acrylic monomers, allylic monomers, acrylamide monomers, and mono- and dicarboxylic unsaturated acids. Vinyl esters include vinyl acetate, vinyl propionate, vinyl butyrates, vinyl isopropyl acetates, vinyl neodeconate and similar vinyl esters; vinyl halides include vinyl chloride, vinyl fluoride, and vinylidene chloride; vinyl aromatic hydrocarbons include styrene, α-methyl styrenes, and similar lower alkyl styrenes. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate, and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, and benzyl acrylate and methacrylate.

Preparation of latex compositions is well-known in the paint and coatings art. Any of the well-known free-radical emulsion polymerization techniques used to formulate latex polymers can be used in the present invention. Polymerization techniques suitable for use herein are taught in U.S. Pat. No. 5,486,576, incorporated herein by reference.

Coating Formulas

Once dispersed into the dispersing media, the composition can be modified with other standard ingredients commonly used to formulate exterior house paints. For example, the dispersions of this invention can be combined with other ingredients such as pigments, extenders, dispersants, surfactants, colorants, paraffins, waxes, UV light stabilizers, rheology modifiers, mildewcides, biocides, fungicides, and other conventional additives. Colorants and pigment dispersions, when used, are typically added in amounts up to about 15% by volume of the total composition.

EXAMPLES

The following examples demonstrate methods of preparation of the compositions of this invention. They also demonstrate the preparation of representative polyurethane components and representative waterborne polymer components. The examples are intended to be representative of the formulations which can be made and are not intended to limit the scope of the invention.

Example 1

Preparation of Polyurethane-Acrylic PIPN with Post-Crosslinking

A reaction vessel equipped with a nitrogen blanket was charged with 30.0 g of n-methyl pyrrolidone, 180.0 g of Rucoflex™ 1015–120 polyester diol mixture, 25.0 g of dimethylolpropionic acid, 6.0 g of trimethylolpropane, 10.0 g of 1,4-cyclohexane dimethanol and approximately 1.0 g of dibutyl tin dilaurate (10% solution in n-methyl pyrrolidone). The contents of the vessel were stirred and the temperature was increased to about 90° C. A 30 minute addition of 146.52 g of meta-1,1,3,3-tetramethylxylylene diisocyanate (m-TMXDI) and 63.35 g of isophorone diisocyanate (IPDI) was then begun. The contents of the vessel were held for 3.5 to 4 hours, or until the theoretical isocyanate value was reached, and then 12.5 g of soya primary amine (Adogen 115D from Witco) were added over a 15 minute period and the reaction was then held under these conditions for 15 minutes to create a polyurethane prepolymer. The polyurethane prepolymer was added to a vessel containing 980.7 g of water and 17.8 g of triethylamine and dispersed well. A commercially available acrylic latex containing 50% butylacrylate, 48% methylmethacrylate and 2% methacrylic acid and having a solids content of 55–60%, in an amount of 2216.9 g, was then added to the vessel. Stirring was continued for an additional 3–4 minutes at room temperature (approx. 25° C.) after which 17.6 g of ethylene diamine in 25 g of water were added to the vessel over a period of five minutes to chain extend the prepolymer while keeping the dispersion cold. The contents were then dispersed for 45 additional minutes.

Example 2

Preparation of Polyurethane-Acrylic PIPN without Post-Crosslinking

A reaction vessel equipped with a nitrogen blanket was charged with 40.0 g of n-methyl pyrrolidone, 180.0 g of Rucoflex 1015–120, 24.0 g of dimethylolpropionic acid, 4.0 g of trimethylolpropane, 10.0 g of 1,4-cyclohexane dimethanol and approx. 1.0 g of dibutyl tin dilaurate (10% solution in n-methyl pyrolidinone). The contents of the vessel were stirred and the temperature was increased to about 90° C. A 30–40 minute addition of 140.54 g of m-TMXDI and 696.62 g of 4,4'-dicyclohexylmethane diisocyanate (Desmodur W) was then begun The contents of the vessel were held for 3.5 to 4 hours to create a polyurethane prepolymer.

The polyurethane prepolymer was then added to a vessel containing 872.9 g of water and 17.2 g of triethylamine and dispersed for three minutes. 2140.9 g of the commercially available acrylic latex of Example 1 were then added to the vessel. Stirring was continued for an additional 3–4 minutes at room temperature (approx. 25° C.) after which 18.0 g of ethylene diamine in 25 g of water were added to the vessel over a period of five minutes to chain extend the prepolymer while keeping the dispersion cold. The contents were then dispersed for 45 additional minutes.

Example 3
Preparation of Polyurethane-Acrylic PIPN with Post-Crosslinking

A reaction vessel equipped with a nitrogen blanket was charged with 30.0 g of n-methyl pyrrolidone, 311.13 g of Rucoflex™ 1015–120 polyester diol mixture, 23.0 g of dimethylolpropionic acid, 3.0 g of trimethylolpropane, 5.0 g of 1,4-cyclohexane dimethanol and approx. 1.0 g of dibutyl tin dilaurate (10% solution in n-methyl pyrolidinone). The contents of the vessel were stirred and the temperature was increased to about 90° C. A 30–40 minute addition of 153.84 g of meta-1,1,3,3-tetramethylxylylene diisocyanate (m-TMXDI) and 39.06 g of isophorone diisocyanate (IPDI) was then begun and the contents of the vessel were held for 3.5 to 4 hours. 2.18 g of aminopropyl triethoxy silane were then added over a 5 minute period and the reaction was held under these conditions for 15 to 20 minutes to create a polyurethane prepolymer. The polyurethane prepolymer was added to a vessel containing 891.56 g of water and 16.8 g of triethylamine and dispersed for three minutes. The commercially available acrylic latex of Example 1, in an amount of 3581.4 g, was added to the vessel. Stirring was continued for an additional 3–4 minutes at room temperature (approx. 25° C.) after which 12.2 g of ethylene diamine in 22 g of water were added to the vessel over a period of five minutes to chain extend the prepolymer while keeping the dispersion cold. The contents were then dispersed for 45 additional minutes.

Example 4
Preparation of Polyurethane-Vinyl Acrylic PIPN with Post-Crosslinking To a vessel equipped with a nitrogen blanket were charged 30.0 g of n-methyl pyrrolidone, 180.0 g of Rucoflex™ 1015–120 polyester diol mixture, 25.0 g of dimethylolpropionic acid, 6.0 g of trimethylolpropane, 10.0 g of 1,4-cyclohexane dimethanol and approx. 1.0 g of dibutyl tin dilaurate (10% solution in n-methyl pyrolidinone). Stirring was then begun and the temperature was increased to about 90° C. 146.52 g of meta-1,1,3,3-tetramethylxylylene diisocyanate (m-TMXDI) and 63.35 g of isophorone diisocyanate (IPDI) were then added over a 30–40 minute period. The contents of the vessel were held for 3.5 to 4 hours then 12.5 g of soya primary amine (Adogen 115D from Witco) were added over a 15 minute period. The reaction was held under these conditions for 30 to 60 minutes to create a polyurethane prepolymer. The polyurethane prepolymer was added to a vessel containing 703 g of water and 17.8 g of triethylamine and dispersed for three minutes. A commercially available vinyl acrylic latex, consisting of 80–90% by weight vinyl acetate with the remainder being butyl acrylate, in an amount of 2418.4 g was added to the vessel. Stirring was continued for an additional 3–4 minutes at room temperature (approx. 25° C.) after which 17.6 g of ethylene diamine in 25 g of water were added to the vessel over a period of five minutes to chain extend the prepolymer while keeping the dispersion cold. The contents were then dispersed for 45 additional minutes.

Example 5
Preparation of Polyurethane-Acrylic-Polysiloxane PIPN with Post-Crosslinking To a reaction vessel equipped with a nitrogen blanket were charged 30.0 g of n-methyl pyrrolidone, 311.1 g of Rucoflex 1015–120, 23 g of dimethylolpropionic acid, 3.6 g of trimethylolpropane, 5 g of 1,4-cyclohexane dimethanol and approx 1.0 g of dibutyl tin dilaurate (10% solution in n-methyl pyrolidinone). Stirring was then begun and the temperature was increased to about 90° C. 45.5 g of IPDI and 155.1 g of m-TMXDI were then added to the reaction vessel. The contents of the vessel were then held for 3.5 to 4 hours, after which 16.8 g of triethylamine were added at 85° C. The contents of the vessel were then held for an additional 5 to 10 minutes, followed by the addition of 13.0 g of soya primary amine (Kemamine P997D from Witco) and holding for an additional 20 to 30 minutes. The polyurethane prepolymer was then transferred into a vessel containing 888.42 g of water and 16.8 g of triethylamine and dispersed for three minutes. An amino functional polydimethylsiloxane emulsion commercially available as BS 1306 from Wacker Silicones in an amount of 140.5 g was then added to the vessel and dispersed for three minutes. 3160.5 g of the commercially available acrylic latex of Example 1 were then added to the vessel. Stirring was continued for an additional 3–4 minutes at room temperature (approx. 25° C.) after which 34.5 g of isophorone diamine in 55 g of water were added to the vessel over a period of five minutes to chain extend the prepolymer, while keeping the dispersion cold. The contents were then dispersed for 45 additional minutes and later filtered.

Example 6
Preparation of Polyurethane-Acrylic-Polysiloxane PIPN with Post-Crosslinking 30.0 g of n-methyl pyrrolidone, 311.13 g of Rucoflex™ 1015–120 polyester diol mixture, 23.0 g of dimethylolpropionic acid, 3.0 g of trimethylolpropane, 5.0 g of 1,4-cyclohexane dimethanol and approx. 1.0 g of dibutyl tin dilaurate (10% solution in n-methyl pyrolidinone) were charged to a reaction vessel equipped with a nitrogen blanket. Stirring was begun and the temperature was then increased to about 89° C. 153.84 g of meta-1,1,3,3-tetramethylxylylene diisocyanate (m-TMXDI) and 40.6 g of isophorone diisocyanate (IPDI) were then added over a 20 minute period and the vessel was then held for 3.5 to 4 hours. Triethylamine in an amount of 16.8 g was then added at 85° C. the reaction was held for 5 minutes, followed by the addition of 2.18 g of aminopropyl triethoxy silane, after which the vessel was held for an additional 15 minutes. The resulting polyurethane prepolymer was then added to a vessel containing 848.8 g of water and dispersed for three minutes. Polysiloxane emulsion BS 1306, commercially available from Wacker, in an amount of 136.2 g was added and stirred for 2 minutes. The acrylic latex of Example 1, in an amount of 3064.2 g, was then added to the vessel. Stirring was continued for an additional 3–4 minutes at room temperature (approx. 25° C.) after which 11.9 g of ethylene diamine in 22 g of water were added to the vessel over a period of five minutes to chain extend the prepolymer while keeping the dispersion cold. The contents were then dispersed for 45 additional minutes.

Example 7
Preparation of Polyurethane-Alkyd PIPN with Post-Crosslinking

A reaction vessel equipped with a nitrogen blanket was charged with 50.0 g of n-methyl pyrolidinone, 277.1 g of Rucoflex™ 1015–120 polyester diol mixture, 26.2 g of dimethylolpropionic acid, 0.9 g of trimethylolpropane and approx. 1.0 g of dibutyl tin dilaurate (10% solution in n-methyl pyrolidinone). The contents of the vessel were stirred and the temperature was increased to about 87° C. A 20 minute addition of 27.3 g of 4,4'-dicyclohexylmethane diisocyanate and 132.7 g of isophorone diisocyanate (IPDI) was then begun. The contents of the vessel were held for 3.25 hours then 5.7 g of soya primary amine (Adogen 115D from Witco) were added. The reaction was held under these conditions for about 30 minutes more to create a polyurethane prepolymer. The resulting polyurethane prepolymer was then added to a vessel containing 667.8 g of water and 18.8 g of triethylamine and dispersed well. An alkyd emulsion, URADIL 516, commercially available from DSM Resins, in an amount of 3133.2 g (60% solids) was then added to the vessel. Stirring was continued for an additional 34 minutes at room temperature (approx. 25° C.) after which 9.5 g of ethylene diamine in 20 g of water were added to the vessel over a period of five minutes to chain extend the prepolymer while keeping the dispersion cold. The contents were then dispersed for 45 additional minutes.

Example 8A
Preparation of Flat Exterior Paint

Using standard paint manufacturing techniques, a flat exterior paint was prepared using the polyurethane-acrylic PIPN of Examples 1–7. The paint formula was as follows:

|  | pts by wt |
|---|---|
| PIPN | 32 |
| water | 10.2 |
| Tamol 165-A dispersant | 2.0 |
| Triton CF-10 surfactant | 0.4 |
| zinc oxide | 2.2 |
| defoamer | 0.09 |
| Minex 4 silica | 13.2 |
| Clay | 4.4 |
| Talc | 4.4 |
| Dowanol DPNB coalescent | 1.4 |
| mildewcide | 0.2 |
| TiO$_2$ slurry | 17.5 |
| water | 11.4 |
| Cellosize ER thickener | 0.4 |
| defoamer | 0.3 |

Example 8B
Preparation of Gloss Exterior Paint.

Using standard paint manufacturing techniques, a gloss exterior paint was prepared using the polyurethane-acrylic PIPN of Examples 1–7. The paint formula was as follows:

|  | pts. by wt. |
|---|---|
| PIPN | 54.2 |
| water | 10 |
| Colloids 286N dispersant | 0.4 |
| Surfynol CT111 surfactant | 0.2 |
| biocide | 0.1 |
| Dehydran 1620 defoamer | 0.15 |
| Ammonia | 0.3 |
| Acrylsol RM 2020 associative thickener | 0.3 |
| Acrylsol RM 825 associative thickener | 0.4 |
| propylene glycol | 0.5 |
| titanium dioxide | 17.9 |
| water | 0.8 |
| DPNB | 1.1 |
| Dehydran 1620 defoamer | 0.15 |
| Acrylsol RM 825 associative thickener | 0.4 |
| water | 13 |

Comparative Example 9

A gloss paint was prepared using a cold blend of (i) 80% by weight of the commercially available acrylic latex of Example 3 and (ii) 20% by weight of a polyurethane dispersion prepared substantially in accordance with the polyurethane prepolymer of Example 3, dispersed in water and chain-extended with ethylene diamine. The latex and polyurethane dispersion were used to make a gloss paint having the formula of the paint of Example 8B.

Comparative Example 10

A flat paint was prepared using a cold blend of (i) 80% by weight of the commercially available acrylic latex of Example 3 and (ii) 20% by weight of a polyurethane dispersion prepared substantially in accordance with the polyurethane prepolymer of Example 3, dispersed in water and chain-extended with ethylene diamine. The latex and polyurethane dispersion were used to make a flat paint having the formula of the paint of Example 8A.

Comparative Example 11

A flat paint was prepared using a cold blend of (i) 80% by weight of the commercially available acrylic latex of Example 3 and (ii) 20% by weight of a polyurethane dispersion prepared substantially in accordance with the polyurethane prepolymer of Example 6, dispersed in water and chain-extended with ethylene diamine and 7.5% by weight of the commercially available polysiloxane emulsion of Example 6. The latex and polyurethane dispersion with polysiloxane blend was used to make a flat paint having the formula of the paint of Example 8A.

Performance

Paints prepared with the partial interpenetrating networks of the present invention were evaluated for their adhesion to chalky substrates. Paints prepared using a standard latex polymer as well as paints prepared using cold blends of polyurethane dispersions and latexes were also evaluated for comparison.

Adhesion to chalky substrates is measured by the Force-to-Peel adhesion test. The substrates were heavily chalked aluminum and latex panels which have been weathered to achieve an ASTM chalk rating of 2. Test panel preparation involves applying 2.5 grams of test paint to a 2 in×4 in (5.08 cm×15.24 cm) area of the substrate; immediately placing a 1.5 in×9 in (3.81 cm×22.86 cm) strip of cheesecloth on the wet paint, leaving a 1.5 in (3.81 cm) overhang over the edge; firmly pressing the cheesecloth into the wet paints, and then saturating the cheesecloth by applying an additional 5.5 grams of test paint. After drying for 7 days at controlled conditions 21° C., 50% relative humidity, a 1 in (2.54 cm) wide strip is cut through the length of the cheesecloth using a utility knife and a template. The test panel is then placed in a fog box for one hour. After removing the panel from the fog box, it is attached horizontally to a ring stand slanting forward at approximately 10° from the perpendicular using utility clamps. The thin edge of the test panel must be in the up direction. A weight hanger is attached to the cheesecloth via an S hook or paperclip. Weight is then increased on the hanger in 10, 20 and 50 gram increments until the cheesecloth peels away from the substrate at a rate of 10–20 mm/minutes. The untested areas must be kept wet during the testing by draping them with a water-saturated piece of cheesecloth.

The amount of weight in grams required to achieve the separation, up to 2000 grams, is reported as well as the mode of failure. Cohesive failure means failure of the paint itself, rather than the bond between the test paint and the substrate. Adhesive failure means separation of the test paint from the substrate. Typically the achievement of from 800 grams and higher in this test is considered significant adhesion. In addition, any cohesive failure ("C" in Table 1), as opposed to 100% adhesive failure ("A" in Table 1) is indicative of true improvements in adhesion.

Adhesion to chalked substrates was also evaluated by the Blister Test of ASTM Method D714. Test panels for this test were heavily chalked aluminum substrates having an ASTM chalk rating of 2, which were then coated with the gloss and flat latex paints listed in Table 1. The test panels were dried for 1 day and then placed in a fog box for 15–22 hours. The panels were rated per ASTM Method D714 as shown in Table 1.

The Wet Adhesion of paint prepared with the PIPNs of the present invention was evaluated by preparing test panels in the same manner as those prepared for the Blister Test, allowing the panels to dry for 1 day, placing the panels in a fog box for 1 day and then allowing the panels to recover for 1 day following the fog box. The panels were then subjected to a cross-hatch test according to ASTM D3359.

The Control Latex paints listed in Table 1 were prepared substantially in accordance with the gloss and flat paint formulas of Examples 8A and 8B. The latex polymer used consisted of 50% by weight butyl acrylate, 48% by weight of methyl methacrylate and 2% by weight of methacrylic acid.

The results of the adhesion testing is presented in Table 1. Paints prepared with the partial interpenetrating networks of the present invention have better adhesion as measured by ASTM Method D3359 than either the latexes themselves or cold blends of polyurethane dispersions and latexes. Performance differences are very dramatic over heavily chalked exterior substrates.

c) adding a waterborne polymer component to said polyurethane prepolymer dispersion, wherein said waterborne polymer component does not contain functional groups that are amine, isocyanate, hydroxy or carboxy reactive and d) chain extending said functionalized polyurethane prepolymer with a chain extender in the presence of said waterborne polymer component;

wherein said waterborne polymer component is selected from the group consisting of latex emulsions, acrylic polymers water-reducible alkyds, alkyd emulsions, polyurethane emulsions, silicone emulsions, polyethylene emulsions, polyamide dispersions and mixtures thereof.

2. The process of claim 1 wherein said functionalized polyurethane prepolymer comprises the reaction product of an active-hydrogen containing composition and an isocyanate-functional composition.

3. The process of claim 2 wherein said active-hydrogen containing composition is selected from the group consisting of diols, triols, amines, aminoalcohols, mercaptans and mixtures thereof.

4. The process of claim 2 wherein said functionalized composition comprises a diisocyanate.

5. The process of claim 4 wherein said diisocyanate is selected from the group consisting of aromatic, cycloaliphatic, and aliphatic diisocyanates and mixtures thereof.

6. The process of claim 5 wherein said diisocyanate is selected from the group consisting of 1,6-hexamethylene diisocyanate, 2,4-toluene diisocyanate, 2,6-toluene diisocyanate, 1,4-phenylene diisocyanate, 4,4'-diphenylmethane diisocyanate, 2,4-diphenylmethane diisocyanate, isophorone diisocyanate, cyclohexane-1,4-diisocyanate, 4,4'-dicyclohexylmethane diisocyanate, p-xylylene diisocyanate, meta-1,1,3,3-tetramethylxylylene diisocyanate, and mixtures thereof.

TABLE 1

| Example | ASTM D3359 (1 day dry) | ASTM D3359 (7 day dry) | Blister (1 day dry) | Wet Adhesion (1 day dry) | Force to Peel |
|---|---|---|---|---|---|
| Control gloss | 0B | 0B | 6D | 0B | 650 A |
| Control flat | 0B | 0B | 6D | 0B | 650 A |
| Example 1 in flat paint | 4B | 4B | 10 | 5B | >2000 C |
| Example 3 in flat paint | 4B | 4B | 10 | 5B | >2000 C |
| Example 3 in gloss paint | 3B | 3B | 10 | 4B | >2000 C |
| Example 5 in gloss paint | 5B | 5B | 10 | 5B | >2000C |
| Example 6 in flat paint | 5B | 5B | 10 | 5B | >2000 C |
| Example 6 in gloss paint | 5B | 5B | 10 | 5B | >2000 C |
| Example 9 | — | — | 6M | — | — |
| Example 11 | 3B | 3B | 8M | — | 1900 C/A |

What is claimed is:

1. A process for producing a coating composition, which process comprises:

a) preparing a functionalized polyurethane prepolymer said prepolymer having at least one functional group selected from hydroxy, isocyanate, acetoacetoxy and n-methylol;

b) dispersing said functionalized polyurethane prepolymer in water to form a polyurethane prepolymer dispersion;

7. The process of claim 1 wherein said polyurethane prepolymer contains functional groups that crosslink upon film formation and exposure to ambient conditions.

8. The process of claim 7 wherein said functional groups are selected from the group consisting of fatty amines, allyl amines, diallyl amines, ethoxylated allyl amines, ethoxylated allyl alcohols, fatty alcohols, allyl alcohols, trimethylol propane mono- and di-allyl ether, hydroxy ethyl acrylate, hydroxy ethyl methacrylate, mono- and di-glycerides obtained by alcoholysis of drying oils with polyols or the reaction of drying fatty acids with polyols, acetoacetate-containing materials, anhydride-functional drying oils, trialkoxysilane, and epoxy-functional oils.

9. The process of claim 1 wherein said waterborne polymer component comprises a latex.

10. The process of claim 2 wherein the ratio of molar equivalents of NCO to total active-hydrogen equivalents is between about 1.01:1 to about 2.0:1.

11. The process of claim 2 wherein between about 1% and about 10% by weight of the total polymer solids is comprised of active-hydrogen containing compositions having at least one pendant ionizable group, said active-hydrogen containing composition selected from the group consisting of diols, amines and mercaptans, and said pendant ionizable group selected from the group consisting of containing carboxylic acid, sulfonic acid, phosphoric acid, ammonium salts, phosphonium salts and sulfonium salts.

12. The process of claim 2 wherein said active-hydrogen containing composition is a diol selected from the group consisting of polyester diols, polyether diols, polyacetal diols, polyamide diols, polyester polyamide diols, poly (alkylene ether)diols, polythioether diols, polycarbonate diols, Bisphenol A and mixtures thereof.

13. The process of claim 1 wherein said chain extender is selected from the group consisting of polyols, amino alcohols, primary or secondary aliphatic, alicyclic, aromatic and heterocyclic amines, amine functional silanes, amine functional silicones, water dispersible or emulsifiable polyisocyanates and polyaldehydes.

14. A process for preparing a surface coating having chalk adhesion to weathered surfaces, the process comprising:

a) preparing an isocyanate functional polyurethane prepolymer;

b) dispersing said isocyanate functional polyurethane prepolymer in water to form a polyurethane prepolymer dispersion;

c) adding a waterborne polymer component to said isocyanate functional polyurethane prepolymer dispersion, wherein said waterborne polymer component does not contain functional groups that are amine, isocyanate, hydroxy or carboxy reactive and d) chain extending said isocyanate functional polyurethane prepolymer with a chain extender in the presence of said waterborne polymer components;

wherein said waterborne polymer component is selected from the group consisting of latex emulsions, acrylic polymers, water-reducible alkyds, alkyd emulsions, polyurethane emulsions, silicone emulsions, polyethylene emulsions, polyamide dispersions and mixtures thereof.

15. The process of claim 14 wherein said polyurethane prepolymer contains functional groups that crosslink upon film formation and exposure to ambient conditions.

16. The process of claim 15 wherein said functional groups are selected from the group consisting of fatty amines, allyl amines, diallyl amines, ethoxylated allyl amines, ethoxylated allyl alcohols, fatty alcohols, allyl alcohols, trimethylol propane mono- and di-allyl ether, hydroxy ethyl acrylate, hydroxy ethyl methacrylate, mono- and di-glycerides obtained by alcoholysis of drying oils with polyols or the reaction of drying fatty acids with polyols, acetoacetate-containing materials, anhydride-functional drying oils, trialkoxysilane, and epoxy-functional oils.

17. The process of claim 14 wherein said chain extender is selected from the group consisting of polyols, amino alcohols, primary or secondary aliphatic, alicyclic, aromatic and heterocyclic amines, amine functional silanes and amine functional silicones.

* * * * *